US010657675B2

(12) United States Patent
Hemmer et al.

(10) Patent No.: US 10,657,675 B2
(45) Date of Patent: May 19, 2020

(54) TECHNIQUES FOR IMPROVED PROGRESSIVE MESH COMPRESSION

(71) Applicant: GOOGLE LLC, Mountain View, CA (US)

(72) Inventors: Michael Hemmer, San Francisco, CA (US); Pierre Alliez, Sophia-Antipolis (FR); Cedric Portaneri, Sophia-Antipolis (FR)

(73) Assignee: GOOGLE LLC, Mountain View, CA (US)

(*) Notice: Subject to any disclaimer, the term of this patent is extended or adjusted under 35 U.S.C. 154(b) by 31 days.

(21) Appl. No.: 15/913,824

(22) Filed: Mar. 6, 2018

(65) Prior Publication Data
US 2019/0279422 A1 Sep. 12, 2019

(51) Int. Cl.
G06T 9/00 (2006.01)

(52) U.S. Cl.
CPC .......... G06T 9/001 (2013.01); *G06T 2210/36* (2013.01)

(58) Field of Classification Search
CPC ... G06T 17/20; G06T 17/205; G06T 2210/36; G06T 9/001
See application file for complete search history.

(56) References Cited

U.S. PATENT DOCUMENTS

| 5,929,860 A * | 7/1999 | Hoppe | G06T 17/20 345/419 |
| 2001/0037402 A1* | 11/2001 | Schneider | H04L 29/06 709/236 |
| 2005/0099420 A1* | 5/2005 | Hoppe | G06T 17/20 345/420 |
| 2005/0253844 A1* | 11/2005 | Hoppe | G06T 17/20 345/428 |
| 2019/0019331 A1* | 1/2019 | Alliez | G06F 17/17 |

FOREIGN PATENT DOCUMENTS

WO WO2017/021644 A1 * 2/2017 ............ G06T 17/20

OTHER PUBLICATIONS

Caillaud, F. et al.: "Progressive Compression of Arbitrary Textured Meshes," Computer Graphics Forum (Proceedings of Pacific Graphics), vol. 35, No. 7. 2016, 10 pages.
Garland, M. et al.: "Surface Simplification Using Quadric Error Metrics," SIGGRAPH 97, 1997, 8 pages.
(Continued)

*Primary Examiner* — Daniel F Hajnik
(74) *Attorney, Agent, or Firm* — Brake Hughes Bellermann LLP

(57) ABSTRACT

An encoder includes a processor and a memory. The encoder generates a first plurality of levels of detail (LODs) and associated first type of vertex split records, each of the first type of vertex split records associated with an LOD of the first plurality of LODs is generated using a first type of collapse operator. The encoder initiates a switch from using the first type of collapse operator to a second type of collapse operator in response to a switching condition being satisfied. The encode further a second plurality of LODs and associated second type of vertex split records, each of the second type of vertex split records associated with a LOD of the second plurality of LODs is generated using the second type of collapse operator.

21 Claims, 5 Drawing Sheets

(56) References Cited

OTHER PUBLICATIONS

Hoppe, H.: "Progressive Meshes," SIGGRAPH '96 Proceedings of the 23rd annual conference on Computer graphics and interactive techniques, 1996, 10 pages.
Wu, J. et al.: "Fast Mesh Decimation by Multiple-Choice Techniques," In Vision, Modeling and Visualization Proceedings (2002), 8 pages.
International Search Report and Written Opinion for International Application No. PCT/US2018/056466, dated Jan. 28, 2019, 14 pages.
Pajarola, Renato et al., "Compressed Progressive Meshes", IEEE Transactions on Visualization and Computer Graphics, vol. 6, No. 1, Jan.-Mar. 2000, pp. 79-92, XP000930482.
Southern, Richard et al., "Generic Memoryless Polygonal Simplification", Proceedings Afrigraph 2001, 1st International Conference on Computer Graphics, Virtual Reality and Visualisation, Nov. 5-7, 2001, pp. 7-15, XP058321613.
Southern, Richard, "Quality Control Tools for Interactive Rendering of 3D Triangle Meshes", Jan. 1, 2002, Retrieved from: http://open.uct.ac.za/handle/11427/14035 on Jan. 16, 2019, pp. 1-127, XP55543162.

\* cited by examiner

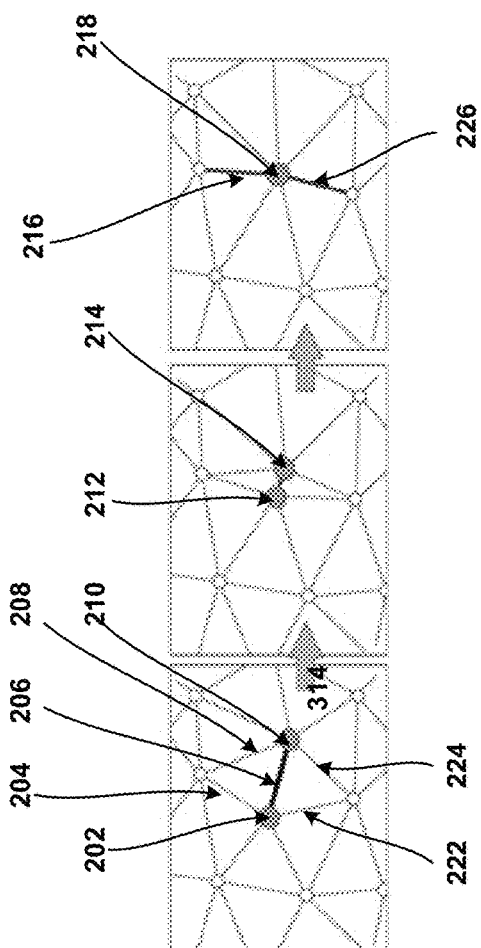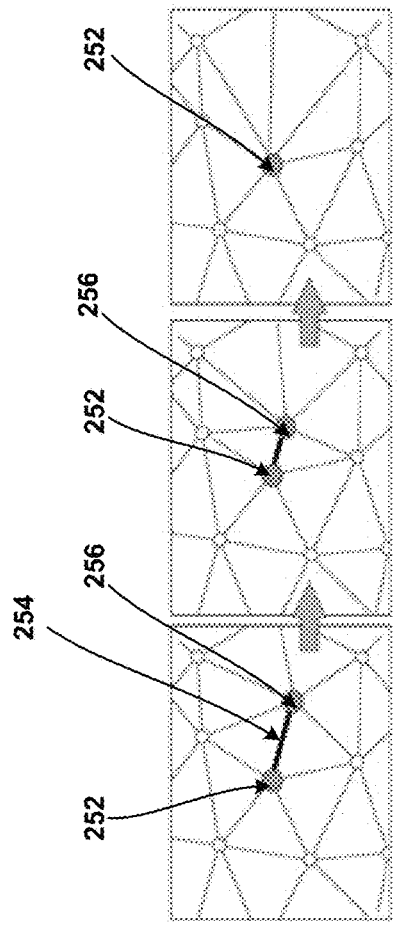
FIG. 2A
FIG. 2B

TECHNIQUES FOR IMPROVED PROGRESSIVE MESH COMPRESSION

FIELD

This application relates, generally, to mesh compression, and specifically, to progressive mesh compression.

BACKGROUND

Progressive mesh compression is the encoding of mesh geometry in stages with each stage generating an improved precision related to mesh connectivity, positions, and other attributes. As each stage results in a better level of detail (LOD) of the compressed model, encoding of the next level takes advantage of the information already contained in the previous level. This is relevant for transmitting high resolution models via the Internet as the user on the receiving end (e.g., a client, a client device, or an application) does not have to wait until the entire model is received from the server. The client can quickly display lower resolution levels of the model before all the information is received at the client device.

SUMMARY

In one aspect, a method includes a computer-implemented method of progressive mesh compression. The method includes generating a first plurality of levels of detail (LODs) and associated first type of vertex split records, each of the first type of vertex split records associated with an LOD of the first plurality of LODs is generated using a first type of collapse operator, switching from using the first type of collapse operator to a second type of collapse operator in response to a switching condition being satisfied, and generating, based on the switching, a second plurality of LODs and associated second type of vertex split records, each of the second type of vertex split records associated with a LOD of the second plurality of LODs is generated using the second type of collapse operator.

In another aspect, an encoder includes a processor and a memory. The memory includes instructions configured to cause the processor to perform operations. The operations include to generate a first plurality of levels of detail (LODs) and associated first type of vertex split records, each of the first type of vertex split records associated with an LOD of the first plurality of LODs is generated using a first type of collapse operator, switch from using the first type of collapse operator to a second type of collapse operator in response to a switching condition being satisfied, and generate, based on the switching, a second plurality of LODs and associated second type of vertex split records, each of the second type of vertex split records associated with a LOD of the second plurality of LODs is generated using the second type of collapse operator.

In a further additional aspect, a non-transitory computer-readable storage medium having stored thereon computer executable program code which, when executed on a computer system, causes the computer system to perform operations. The operations include generating a first plurality of levels of detail (LODs) and associated first type of vertex split records, each of the first type of vertex split records associated with an LOD of the first plurality of LODs is generated using a first type of collapse operator, switching from using the first type of collapse operator to a second type of collapse operator in response to a switching condition being satisfied, and generating, based on the switching, a second plurality of LODs and associated second type of vertex split records, each of the second type of vertex split records associated with a LOD of the second plurality of LODs is generated using the second type of collapse operator.

BRIEF DESCRIPTION OF THE DRAWINGS

Example implementations will become more fully understood from the detailed description given herein below and the accompanying drawings, wherein like elements are represented by like reference numerals, which are given by way of illustration only and thus are not limiting of the example implementations and wherein:

FIG. 2A illustrates an example collapsing of edges using a full-edge collapse operator, according to at least one example implementation.

FIG. 2B illustrates an example collapsing of edges using a half-edge collapse operator, according to at least one example implementation.

Figure 1B:
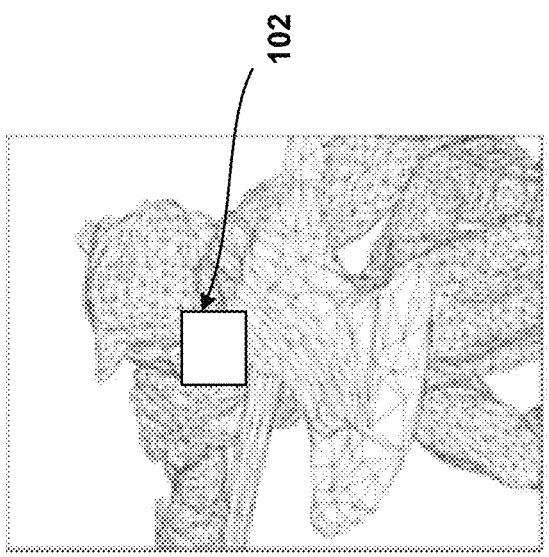
FIG. 1B illustrates a portion of a geometric model compressed using a second type of edge collapse operator, according to at least one example implementation.

It should be noted that these Figures are intended to illustrate the general characteristics of methods, structure, or materials utilized in certain example implementations and to supplement the written description provided below. These drawings are not, however, to scale and may not precisely reflect the precise structural or performance characteristics of any given implementation, and should not be interpreted as defining or limiting the range of values or properties encompassed by example implementation. The use of similar or identical reference numbers in the various drawings is intended to indicate the presence of a similar or identical element or feature.

DETAILED DESCRIPTION

An example improved (or enhanced) progressive mesh compression mechanism is described herein. In one implementation, an encoder (for example, at a server) may process an input mesh and generate a LOD and associated vertex split records. The processing of the input mesh includes processing a batch of edge collapse operators. The generating of the LOD includes generating a coarser mesh and associated vertex split records. The vertex split records are used by a decoder (e.g., a client, a user device, a browser application, etc.) for decoding and/or re-constructing the mesh, for example, for displaying at the client. In one implementation, the enhanced progressive mesh compression may include, for example, 60 LODs and 500,000 vertices (for the highest level LOD).

A batch of edge collapse operators may include either full-edge collapse operators or half-edge collapse operators.

For example, a first batch of edge collapse operators may contain a plurality (e.g., 5,000) of full-edge collapse operators and a second batch of edge collapse operators may contain a plurality (e.g., 7,000 etc.) of half-edge collapse operators. The number of collapse operators in a batch, as described above, is just an example, and a batch may include any number of collapse operators for compressing an input mesh. Although the type of collapse operators in a batch may be full-edge or half-edge collapse operators, the proposed improved progressive mesh compression focuses on a batch of collapse operators containing either full-edge collapse operators or half-edge collapse operators. In a progressive mesh compression, different LODs may be created by collapsing (or decimating) a mesh (e.g., an input mesh) with successive batches of edge collapse operators until a very coarse mesh is generated. For each batch of edge collapse operators, an independent set of edges may be selected from a priority queue and collapsed.

An encoder may process an input mesh and generate a plurality of LODs and associated vertex split records. In one example implementation, the encoder may process the input mesh using a batch of first type of collapse operators and generate a LOD and associated first type of vertex split records. For instance, the encoder may process an input mesh using a first batch of collapse operators and generate a LOD1 and associated first type of vertex split records (VSR1). The encoder may continue with the progressive mesh compression and may process LOD1 as input mesh using a second batch of first type of collapse operators. A LOD2 and associated first type of vertex split records (VSR2) are generated. The generating of the LODs and associated first type of vertex split records may continue until a switching is triggered for switching the collapse operator from a first type of collapse operator to a second type of collapse operator or a coarsest LOD and associated first type of vertex records are generated.

The encoder may include a switching module which may trigger (or generate) a message (or some kind of indicator) to initiate a switch from the first type of collapse operator to a second type of collapse operator. That is, the switching module may trigger a message to initiate a switch so that a second type of edge collapse operator is used to collapse edges. In some implementations, the switching module may monitor the progressive mesh compression and may trigger the switching in response (or based on) a switching condition being satisfied. For example, the switching condition may be based on a user defined parameter, error threshold, or a combination thereof.

The encoder, after the switching, may continue with generating of a plurality of LODs and associated second type of vertex split records. In one implementation, the encoder may use a batch of second type of collapse operators and generate a LOD and associated second type of vertex split records. For example, the encoder may process the input mesh, which may be the mesh that was generated immediately preceding the mesh being currently generated (for example, LOD2), using a second batch of collapse operators and generate a LOD (e.g., LOD3) and associated second type of vertex split records (VSR3). After the generating of the LOD3 and VSR3, the encoder may continue with the progressive mesh compression and continue with generating the LODs and associated second type of vertex split records. For example, the encoder may use LOD3 as the input mesh and generate a LOD4 and associated second type of vertex split records (VSR4), and continue with generating LOD5 and VSR5 using LOD4 as the input mesh. The generating of the LODs and the associated second type of vertex split records may continue until a switching (e.g., to the first type of collapse operator) is triggered.

As described above in reference to the switching module initiating a switch from the first type of collapse operator to the second type of collapse operator, in one example implementation, the switching module may trigger a switch from the second type of collapse operator to the first type of collapse operator if a switching condition is satisfied. The switching condition for switching from the second type of collapse operator to the first type of collapse operator may be the same switching condition that is used to initiate a switch from the first type of collapse operator to the second type of collapse operator. However, in some example implementations, the switching conditions may be different, and may be user defined or based on different error thresholds.

The encoder may transmit a LOD and associated vertex split records to a decoder (e.g., decoder at a client). The transmission of a LOD and associated vertex split records may be based on a message received from the decoder. In one example implementation, the encoder may send the lowest resolution level LOD (e.g., LOD5) and associated vertex split records (e.g., VSR5) and vertex split records up until the highest requested LOD based on the message received from the decoder. The transmission of the associated vertex split records is incremental and does not have to be transmitted together (e.g., may be transmitted separately). The decoder may be interested in the next level LOD (e.g., LOD at a better resolution level) when the decoder needs the LOD for processing or displaying at the client (e.g., client device, browser application, etc.). In other words, the decoder may want the next level LOD and the encoder transmits the associated vertex split records associated with the next level LOD. In the improved progressive mesh compression being described herein, the LOD and associated vertex split records are transmitted in an order (from a resolution level perspective) that is opposite to the order they are generated. That is, the lowest resolution level LOD and associated vertex split records are transmitted first, depending on the message received from the decoder, and followed by vertex split records for higher level LODs and all the way up to the highest level LOD.

The improved progressive mesh compression described herein provides for progressive mesh compression by balancing quality (e.g., distortion) and cost (e.g., bit-rate or bits per vertex). That is, the improved progressive mesh compression balances distortion and bit-rate by switching between the first and second type of collapse operators (or vice versa). For example, in one example implementation, the improved progressive mesh compression may be performed by starting the progressive mesh compression with 30% of half-edge collapse operators followed by 70% of full-edge collapse operators. This may generate a progressively compressed mesh of same or similar quality with reduction in bit-rate (e.g., an estimated 18% reduction in bit-rate in one implementation). Thus, the improved progressive mesh compression provides for an efficient (e.g., faster) transmission of a LOD and associated vertex split records (from an encoder to a decoder) by allowing the decoder display the lower resolution level model quickly or display a model of higher resolution level at a given time that would otherwise would not be possible.

Figure 1A:
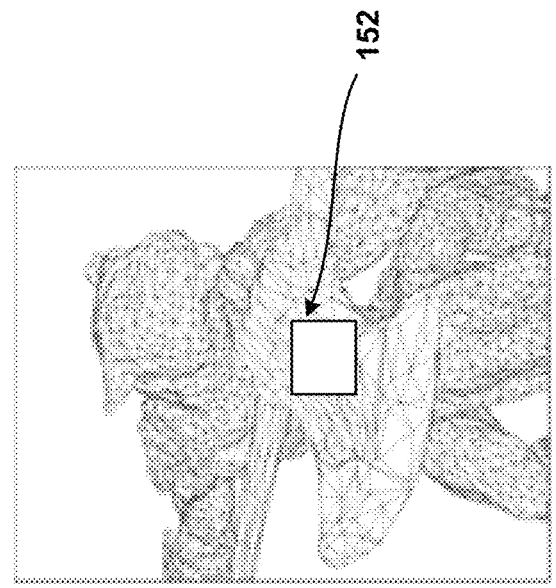
FIG. 1A illustrates a portion of a geometric model (or an image of a geometric model) compressed using a first type of edge collapse operator, according to at least one example implementation.

FIG. 1A illustrates a portion of a geometric model 100 being compressed using a first type of edge collapse operators.

In FIG. 1A, area 102 of the geometric model 100 represents an area which may be compressed using an improved progressive mesh compression. In one example implementation, the area 102 may be compressed using a first type of collapse operator. The first type of collapse operator may be a half-edge collapse operator (described in detail in reference to FIG. 2A) or a full-edge collapse operator (described in detail in reference to FIG. 2B). As described above, the progressive mesh compression may generate a LOD and associated first type of vertex split records. The LOD and the associated first type of vertex split records may be generated by collapsing an input mesh with successive batches (e.g. one or more batches) of first type of edge collapse operators until reaching a very coarse mesh. During the improved progressive mesh compression, for each batch of the first type of edge collapse operators, an independent set of edges may be selected from a priority queue and collapsed. In one implementation, based on a specific error metric, each candidate edge in the priority queue may be associated with a weight corresponding to the increase of the error induced by its collapse.

The LODs and associated vertex split records may be generated using one type of edge collapse operators throughout the whole edge collapse process. However, such generation using one type of edge collapse operators may not be efficient or meet quality expectations. For instance, the use of the full-edge collapse operator throughout the whole edge collapse process may generate, upon decoding by a decoder on the receiving end, a higher-quality geometric model. But, a higher amount of data has to be transmitted, for example, from the encoder to the decoder. The proposed improved progressive mesh compression uses at least two types of edge collapse operators for generating LODs and associated vertex split records. The two types of edge collapse operators may be full-edge and half-edge collapse operators.

FIG. 1B illustrates a portion of a geometric model 150 being compressed using a second type of edge collapse operator.

In FIG. 1B, area 152 of the geometric model 150 represents an area which may be compressed using an improved progressive mesh compression. In one example implementation, the area 152 may be compressed using a second type of edge collapse operator. The second type of edge collapse operator may be a full-edge collapse operator (described in detail in reference to FIG. 2A) or a half-edge collapse operator (described in detail in reference to FIG. 2B). That is, the first and second types of edge collapse operators are different (not the same type of edge collapse operators).

The LODs and the associated second type of vertex split records may be generated by collapsing an immediately preceding mesh with successive batches (e.g. one or more batches) of second type of edge collapse operators until reaching a very coarse mesh. During the improved progressive mesh compression, for each batch of the second type of edge collapse operators, an independent set of edges may be selected from a priority queue and collapsed. In one implementation, based on a specific error metric, each candidate edge in the priority queue may be associated with a weight corresponding to the increase of the error induced by its collapse.

FIG. 2A illustrates an example collapsing of edges 200 using a full-edge collapse operator, according to at least one example implementation.

In FIG. 2A, two vertices (202 and 210) connected by an edge (206) are collapsed using a full-edge collapse operator. In such a full-edge collapse operation, the two vertices (202 and 210) are merged and a new vertex 218 is generated. The location of the new vertex 218 is determined by minimizing the local error. However, this may result in requiring higher number of bits for encoding the two residuals between the merged vertex and its two ancestors to reverse the full-edge collapse operator during the decoding. As the newly merged vertex 218 is being generated, edges 204 and 208 are collapsed into edge 216 and edges 222 and 224 are collapsed into edge 226. As illustrated in FIG. 2A, new edge 216 is generated by merging edges 204 and 208 and new edge 226 is generated by merging edges 222 and 226. The merging of two vertices and the collapsing of edges generates a LOD and associated vertex split records. The vertex split records are used by the decoder to decode or re-construct the model.

FIG. 2B illustrates an example collapsing of edges 250 using a half-edge collapse operator, according to at least one example implementation.

In FIG. 2B, two vertices (252 and 256) connected by an edge (254) are collapsed using a half-edge collapse operator. In such a collapse operation, one of the vertices, for example, vertex 256, is moved/merged into the vertex 252. This will result in generating data related to the vertex 256 as the position of the other vertex 252 has not changed. In other words, in the half-edge collapse operator operation, the merged vertex is restricted to be located at one of its two ancestors. While the local error may be larger than in the full-edge collapse operator operation, only one residual vector has to be decoded to reverse the operator during decoding (e.g., by subsampling the mesh vertices instead of resampling). This may result in requiring lower number of bits for representing the information but the distortion rate may be higher (e.g., more distorted lower LODs).

Figure 3:
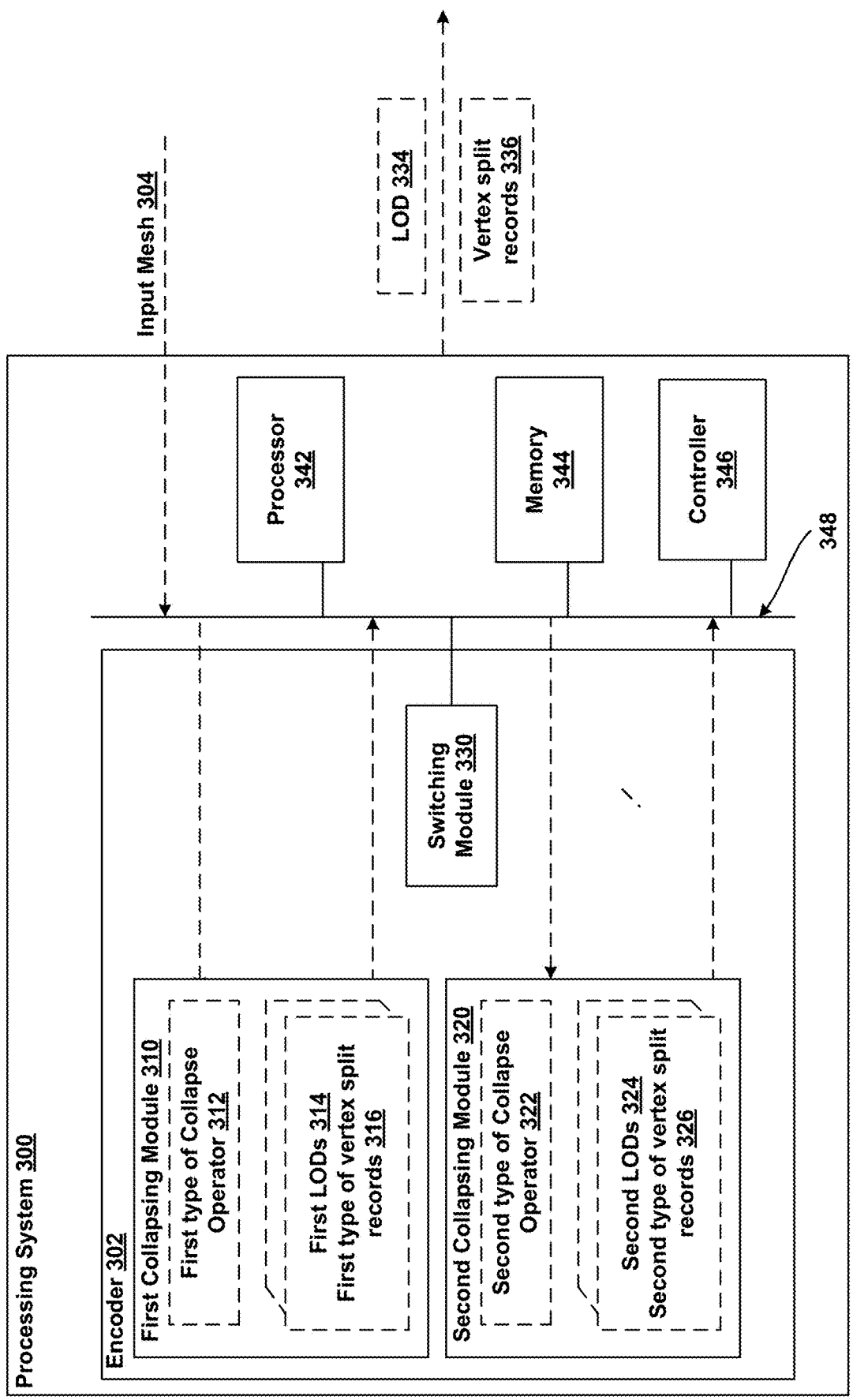
FIG. 3 illustrates a block diagram of a processing system, including an encoder, according to at least one example implementation.

FIG. 3 illustrates a block diagram of an encoder 300 for an improved progressive mesh compression.

As shown in FIG. 3, the example processing system 300 may include at least one processor 342, at least one memory 344, a controller 346, and/or an encoder 302. The at least one processor 342, the at least one memory 344, the controller 346, and/or the encoder 302 may be communicatively coupled via bus 348.

The processor 342 may be utilized to execute instructions stored in the memory 344, so as to thereby implement the various features and functions described herein, or additional or alternative features and functions. The processor 342 and the memory 344 may be utilized for various other purposes. For example, the memory 344 may represent an example of various types of memory and related hardware and software, or a combination thereof, which may be used to implement any one of the components or modules described herein.

The memory 344 may be configured to store data or information associated with the processing system 300. For example, the memory 344 may be configured to store codecs (e.g., encoder 302), meshes or information related to meshes (e.g., input mesh 304, LODs, vertex split records), and any other associated or related data for enhancing the progressive mesh compression. The memory 344 may be a shared resource. For example, the processing system 300 may be an element of a larger system (e.g., a server, a personal computer, a mobile device, and the like). Therefore, the memory 344 may be configured to store data or information associated with other elements (e.g., image/video serving, web browsing, or wired/wireless communications) within the larger system.

The controller 346 may be configured to generate various control signals and communicate the control signals to various blocks of the processing system 300. The controller 346 may be configured to generate the control signals to implement the techniques (e.g., mechanisms, procedures, etc.) described herein. The controller 346 may be configured to control the encoder 302 to a mesh (e.g., input mesh 304), and the like according to example implementations or aspects. For example, the controller 346 may generate control signals corresponding to parameters to implement an encoding mechanism (e.g., improved progressive mesh compression).

In one implementation, the encoder 302 may include a first collapsing module 310 and a second collapsing module 320 for performing an improved progressive mesh compression. For example, the first collapsing module 310 may be configured to receive (e.g., read) an input mesh (e.g., input mesh 304) and process the input mesh 304 using a first type of edge collapse operator 312. That is, the first collapsing module 310 runs (or executes) a batch of first type of collapse operators and generates a LOD 314 (of a first plurality of LODs) and associated first type of vertex split records 316. The LOD 314 and first type of vertex split records 316 may be stored in the memory 344. As shown in FIG. 3, the first collapsing module 310 may process a plurality of batches and generate a first plurality of LODs and associated first type of vertex split records (each LOD has its own associated vertex split records).

The generating of the first plurality of LODs and the associated first type of vertex split records may continue until a switching is initiated by the switching module 330. The switching module 330 may initiate a switching, from one type of collapse operator to another type of collapse operator, when a switching condition is satisfied. The switching condition may be based at least on one of a user-defined parameter, error threshold (during collapsing), or based at least on identifying a branching point. In one implementation, for example, the encoder, to identify the branching point (or the optimum point for switching) may offload the processing of the batches to other servers to determine the optimal switching point. For instance, all possible switching scenarios are evaluated by other servers offline in a distributed environment (e.g., cloud) and the optimal switching location notified to the switching module 330.

The second collapsing module 320, upon switching to the second type of collapse operators, may process the immediately preceding LOD and generate a LOD (of the second plurality of LODs 324) and associated second type of vertex split records 326. The second collapsing module 320 may retrieve the input mesh from the memory 344. The input mesh for the second collapsing module 320 may be the immediately preceding mesh (e.g., LOD2) that has been generated and stored in the memory 344. The LOD and the second type of vertex split records are then stored in the memory 344.

Figure 4:
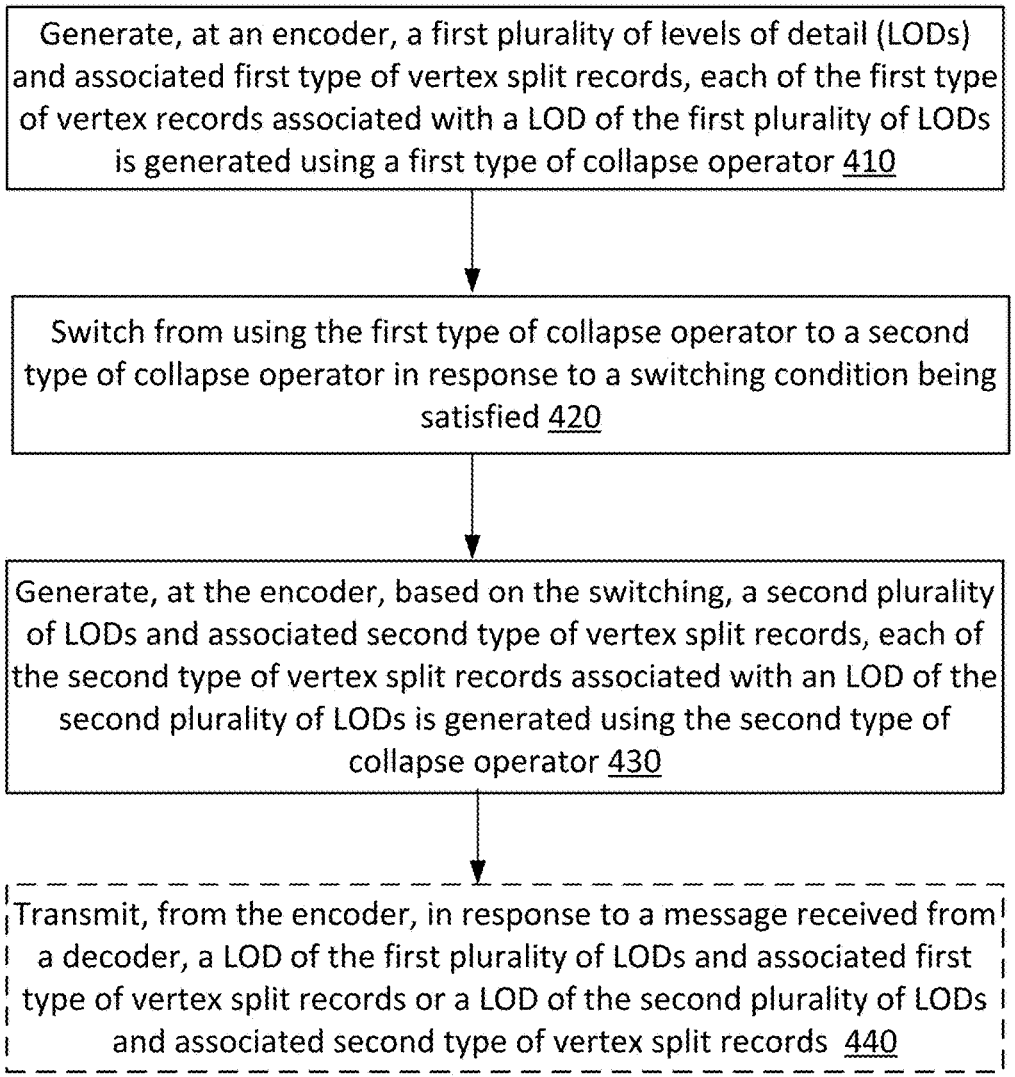
FIG. 4 illustrates a flowchart of a method of performing an improved progressive mesh compression, according to at least one example implementation.

FIG. 4 illustrates a flowchart 400 of a method of an improved progressive mesh compression according to least one example implementation.

At block 410, the encoder 302 and/or the first collapsing module 310 may generate a first plurality of levels of detail (LODs) and associated first type of vertex split records, each of the first type of vertex split records associated with an LOD of the first plurality of LODs is generated using a first type of collapse operator. For example, in one implementation, the encoder 302 and/or or the first collapsing module 310 may generate a first plurality of LODs and associated first type of vertex split records, e.g., LOD1 (314) and VSR1 (316); and LOD2 (315) and VSR2 (317). The vertex split records VSR1 (316) and VSR2 (317) are generated using the first type of collapse operator 312. In one implementation, the first type of collapse operator 312 may be a half-edge collapse operator or a full-edge operator.

At block 410, the encoder 302 and/or the switching module 330 may switch from using the first type of collapse operator to a second type of collapse operator in response to a switching condition being satisfied. For example, in one implementation, the encoder 302 and/or or the switching module 330 may, in response to a switching condition being satisfied, switch from using a first type of collapse operator to a second type of collapse operator. In one example, implementation, the switching may be from the first to the second type of edge collapse operator or from the second to the first type of edge collapse operator.

At block 430, the encoder 302 and/or the second collapsing module 320 may generate, based on the switching, a second plurality of LODs and associated second type of vertex split records, each of the second type of vertex split records associated with a LOD of the second plurality of LODs is generated using the second type of collapse operator. For example, in one implementation, the encoder 302 and/or or the second collapsing module 320 may generate a second plurality of LODs and associated second type of vertex split records, e.g., LOD3 (324) and VSR3 (326); LOD4 (325) and VSR4 (327); LOD5 (328) and VSR5 (329). The vertex split records (VSR3, VSR4, and VSR5) are generated using the second type of collapse operator 322. In one implementation, the second type of collapse operator 322 may be a full-edge operator or a half-edge collapse operator. In other words, the first type of collapse operator is different from the second type of collapse operator.

Alternatively, at block 440, the encoder 302 may, in response to a message received from a decoder, transmit a LOD of the first plurality of LODs and associated first type of vertex split records or a LOD of the second plurality of LODs and associated second type of vertex split records. For example, in one implementation, the encoder 302 may transmit LOD5 (328) and VSR5 (329) in response to a message received from a decoder. In another example implementation, the encoder 302 may transmit LOD5 (328) and VSR4 (327) in response to a message received from a decoder. In some other example implementations, the LOD may be a lowest LOD being requested from the decoder, and the vertex split records include vertex split records associated with the lowest LOD and vertex split records associated with LODs up to a highest LOD. In other words, the client may request the next LOD, but the encoder may send the vertex split records associated with the next LOD. In some more example implementations, the encoder may send vertex split records associated with LODs up to the highest LOD.

The improved progressive mesh compression mechanism provides for progressive mesh compression by balancing quality (e.g., distortion) and cost (e.g., bit-rate or bits per vertex). That is, the improved progressive mesh compression mechanism balances distortion and bit-rate by switching between the first and second type of collapse operators (or vice versa). For example, in one example implementation, improved progressive mesh compression may be performed by starting the progressive compression mechanism with 30% of half-edge collapse operator followed by 70% of full-edge collapse operators. This may provide for a compressed mesh of same or similar quality with an estimated 18% reduction in bit-rate. Thus, the improved progressive mesh compression provided for an efficient (e.g., faster) transmission of LODs and associated vertex split records (from an encoder to a decoder) by enabling the decoder display the lower resolution level model quickly or display a model of higher resolution level that would otherwise would not be possible.

Figure 5:
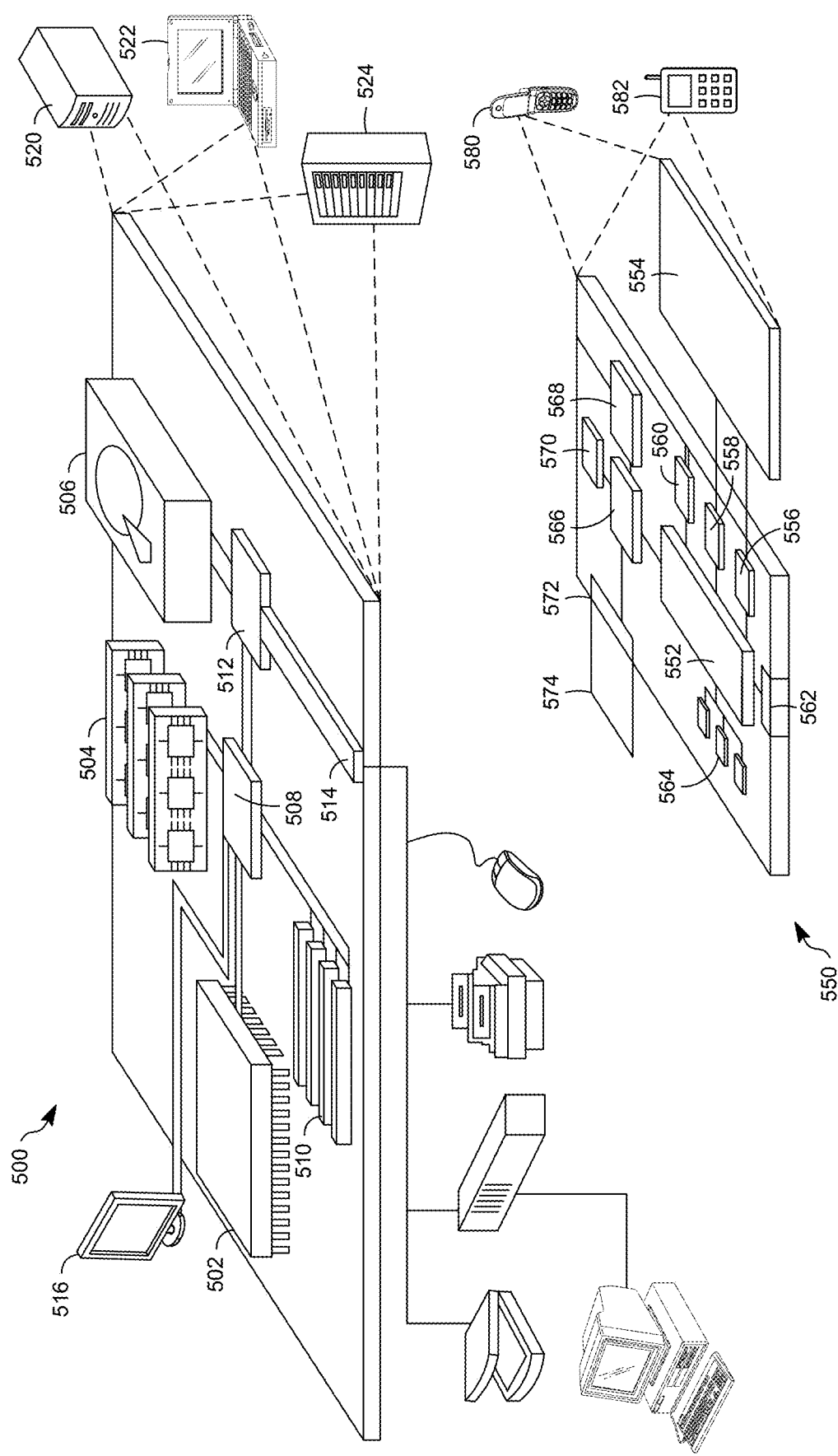
FIG. 5 shows an example of a computer device and a mobile computer device according to at least one example implementation.

FIG. 5 shows an example of a computer device 500 and a mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. The computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, Wi-Fi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an, and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example implementations and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative implementations, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example implementations are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example implementations not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or implementations herein disclosed irrespective of whether or not that particular combination has been specifically enumerated in the accompanying claims at this time.

While example implementations may include various modifications and alternative forms, implementations thereof are shown by way of example in the drawings and will herein be described in detail. It should be understood, however, that there is no intent to limit example implementations to the particular forms disclosed, but on the contrary, example implementations are to cover all modifications, equivalents, and alternatives falling within the scope of the claims. Like numbers refer to like elements throughout the description of the figures.

What is claimed is:

1. A computer-implemented method of progressive mesh compression, comprising:
   generating, at an encoder, a first plurality of levels of detail (LODs) and associated first type of vertex split records, the first type of vertex split records associated with an LOD of the first plurality of LODs are generated using a first type of collapse operator;
   switching from using the first type of collapse operator to a second type of collapse operator in response to a switching condition being satisfied, the switching condition being based at least on identifying a branching point, to balance distortion and bits per vertex, from a plurality of branching points; and
   generating, at the encoder, after the switching, a second plurality of LODs and associated second type of vertex split records, the second type of vertex split records associated with a LOD of the second plurality of LODs are generated using the second type of collapse operator.

2. The method of claim 1, further comprising:
   transmitting, from the encoder, in response to a message received from a decoder, a LOD of the first plurality of LODs and associated first type of vertex split records or a LOD of the second plurality of LODs and associated second type of vertex split records, wherein the LOD is a lowest LOD being requested from the decoder, and the vertex split records include vertex split records associated with the lowest LOD and vertex split records associated with LODs up to a highest LOD.

3. The method of claim 1, wherein generating a LOD of the first plurality of LODs and associated first type of vertex split records includes:
   collapsing, using the first type of collapse operator, edges of a LOD immediately preceding the LOD being generated; and
   generating the associated vertex split records based on the collapsing.

4. The method of claim 1, wherein generating a LOD of the second plurality of LODs and associated second type of vertex split records includes:
   collapsing, using the second type of collapse operator, edges of a LOD immediately preceding the LOD being generated; and
   generating the associated vertex split records based on the collapsing.

5. The method of claim 1, wherein the first type of collapse operator is a full-edge collapse operator and the second type of collapse operator is a half-edge collapse operator.

6. The method of claim 1, wherein the switching condition is based at least on one of a user-defined parameter or an error threshold.

7. The method of claim 1, wherein the switching condition is based at least on identifying a branching point upon generating of the first LOD, the switching being triggered at the branching point.

8. The method of claim 1, wherein the first type of collapse operator is a half-edge collapse operator and the second type of collapse operator is a full-edge collapse operator.

9. An encoder, comprising:
a processor; and
a memory, the memory including instructions configured to cause the processor to:
generate a first plurality of levels of detail (LODs) and associated first type of vertex split records, the first type of vertex split records associated with an LOD of the first plurality of LODs are generated using a first type of collapse operator;
switch from using the first type of collapse operator to a second type of collapse operator in response to a switching condition being satisfied, the switching condition being based at least on identifying a branching point, to balance distortion and bits per vertex, from a plurality of branching points; and
generate, after the switching, a second plurality of LODs and associated second type of vertex split records, the second type of vertex split records associated with a LOD of the second plurality of LODs are generated using the second type of collapse operator.

10. The encoder of claim 9, further comprising:
transmitting, from the encoder, in response to a message received from a decoder, a LOD of the first plurality of LODs and associated first type of vertex split records or a LOD of the second plurality of LODs and associated second type of vertex split records, wherein the LOD is a lowest LOD being requested from the decoder, and the vertex split records include vertex split records associated with the lowest LOD and vertex split records associated with LODs up to a highest LOD.

11. The encoder of claim 9, wherein generating a LOD of the first plurality of LODs and associated first type of vertex split records includes:
collapsing, using the first type of collapse operator, edges of a LOD immediately preceding the LOD being generated; and
generating the associated vertex split records based on the collapsing.

12. The encoder of claim 9, wherein generating a LOD of the second plurality of LODs and associated second type of vertex split records includes:
collapsing, using the second type of collapse operator, edges of a LOD immediately preceding the LOD being generated; and
generating the associated vertex split records based on the collapsing.

13. The encoder of claim 9, wherein the first type of collapse operator is a full-edge collapse operator and the second type of collapse operator is a half-edge collapse operator.

14. The encoder of claim 9, wherein the switching condition is based at least on one of a user-defined parameter or an error threshold.

15. The encoder of claim 9, wherein the switching condition is based at least on identifying a branching point upon generating of the first LOD, the switching being triggered at the branching point.

16. A non-transitory computer-readable storage medium having stored thereon computer executable program code which, when executed on a computer system, causes the computer system to perform a method, comprising:
generating, at an encoder, a first plurality of levels of detail (LODs) and associated first type of vertex split records, the first type of vertex split records associated with an LOD of the first plurality of LODs are generated using a first type of collapse operator;
switching from using the first type of collapse operator to a second type of collapse operator in response to a switching condition being satisfied, the switching condition being based at least on identifying a branching point, to balance distortion and bits per vertex, from a plurality of branching points; and
generating, at the encoder, after the switching, a second plurality of LODs and associated second type of vertex split records, the second type of vertex split records associated with a LOD of the second plurality of LODs are generated using the second type of collapse operator.

17. The computer-readable storage medium of claim 16, the method further comprising:
transmitting, from the encoder, in response to a message received from a decoder, a LOD of the first plurality of LODs and associated first type of vertex split records or a LOD of the second plurality of LODs and associated second type of vertex split records, wherein the LOD is a lowest LOD being requested from the decoder, and the vertex split records include vertex split records associated with the lowest LOD and vertex split records associated with LODs up to a highest LOD.

18. The computer-readable storage medium of claim 16, wherein generating a LOD of the first plurality of LODs and associated first type of vertex split records includes:
collapsing, using the first type of collapse operator, edges of a LOD immediately preceding the LOD being generated; and
generating the associated vertex split records based on the collapsing.

19. The computer-readable storage medium of claim 16, wherein generating a LOD of the second plurality of LODs and associated second type of vertex split records includes:
collapsing, using the second type of collapse operator, edges of a LOD immediately preceding the LOD being generated; and
generating the associated vertex split records based on the collapsing.

20. The computer-readable storage medium of claim 16, wherein the first type of collapse operator is a full-edge collapse operator and the second type of collapse operator is a half-edge collapse operator.

21. The computer-readable storage medium of claim 16, wherein the switching condition is based at least on one of a user-defined parameter or an error threshold.

* * * * *